United States Patent [19]

Matoushek

[11] Patent Number: 4,972,206

[45] Date of Patent: Nov. 20, 1990

[54] METHOD AND APPARATUS FOR FUSING THERMAL TRANSFER PRINTS

[75] Inventor: Robert J. Matoushek, Rochester, N.Y.

[73] Assignee: Eastman Kodak Company, Rochester, N.Y.

[21] Appl. No.: 457,038

[22] Filed: Dec. 26, 1989

[51] Int. Cl.$^5$ ..................... G01D 15/10; G03G 15/20; B41J 2/00; H05B 1/00

[52] U.S. Cl. ................................ 346/76 PH; 346/25; 219/216; 355/282; 355/285; 355/295; 400/120

[58] Field of Search .................... 219/216; 346/76 PH, 346/25; 355/282, 285, 289, 290, 295; 400/120

[56] References Cited

U.S. PATENT DOCUMENTS 4,163,892 8/1979 Komatsu et al. .................... 219/216

4,642,655 2/1987 Sparer et al. .................. 346/76 PH

FOREIGN PATENT DOCUMENTS 0156274 9/1982 Japan .................................. 400/120

*Primary Examiner*—Bruce A. Reynolds

*Assistant Examiner*—Huan Tran

*Attorney, Agent, or Firm*—John D. Husser

[57] ABSTRACT

A method for fusing thermal transfer prints to avoid blister-type defects. The method includes in order, the steps of rapidly heating respective print image portions to a first temperature slightly below their respective components boiling temperature, maintaining respective print image portions at approximately the first temperature for a time period sufficient to allow significant evaporation from said print portions and, after such period, rapidly heating such significantly dried print portions to the desired fusing temperature, above the components boiling points.

5 Claims, 3 Drawing Sheets

METHOD AND APPARATUS FOR FUSING THERMAL TRANSFER PRINTS

FIELD OF THE INVENTION

The present invention relates to thermal printing of the kind where dye is imagewise transferred from donor web sections to receiver sheets and, more specifically, to improved processes and devices for fusing dye images upon the receiver after completion of such transfer.

BACKGROUND OF INVENTION

In thermal transfer printing successive sections of a donor sheet or web are fed through a linear printing region where they move, in contact with successive lines of a receiver, past a thermal print head comprising a linear array of selectively energizable, pixel-size heater elements. The print head or other means urge the juxtaposed donor and receiver sections into intimate contact at the print zone so that dye is transferred from the donor to the receiver in the pixels beneath energized heater elements of the array. In multicolor thermal printing the receiver is moved through the printing zone a plurality of times so that a plurality of different color image components (e.g. cyan, magenta and yellow) can be successively printed on the donor, in register.

One common configuration for effecting such multicolor printing is described in U.S. Pat. No. 4,745,413, wherein the donor sheet is clamped onto the periphery of a print drum which rotates successive line portions past a linear heater element array. A web bearing successive donor sections of yellow, magenta and cyan dye is fed through the print zone, between the print array and receiver, in a timed relation so that a different color donor section moves through the print zone with the receiver, respectively during each of the print drum rotations.

Although not essential in thermal transfer printing, it is often desirable to heat and compress the dye image(s) on the surface of a receiver sheet. This post treatment, referred to as fusing, seals and stabilizes the dyes of the images and thereby enhances the keeping quality of the print.

Materials such as described in U.S. Pat. Nos. 4,642,655 and 4,804,975 benefit from such fusing, which can include heating of the print to a temperature up to about 240° F. The print materials contain water and/or other liquid components and the vaporization of those liquids during such fusing has, on occasion, caused blister-type defects in the print material.

SUMMARY OF INVENTION

An important object of the present invention is to provide a method for fusing thermal transfer prints that significantly reduces or eliminates the blister defects described above.

Thus, in one aspect, the present invention constitutes an improved method for fusing thermal transfer prints comprising, in order, the steps of rapidly heating respective print image portions to a first temperature slightly below their liquid components boiling temperature, maintaining respective print image portions at approximately said first temperature for a time period sufficient to allow significant evaporation from respective print image portions and, after such period, rapidly heating respectively dried print image portions to the desired fusing temperature, above their liquid components boiling points.

In another aspect the present invention constitutes an improved apparatus for performing such fusing procedure. Such apparatus comprises heating means, including a heater surface movable along an extended fusing path from a path ingress to a path egress; means, proximate the path ingress, for feeding the receiver onto the heating means with its image face in juxtaposition with the heater surface; first nip means for urging portions of the receiver moving successively therepast into high pressure contact with the heater surface; and second nip means, located with respect to said first nip means so as to provide an extended length bake region of non-pressurized contact for the receiver, and constructed for urging portions of the receiver moving therepast, after traverse through such bake region, into high pressure contact with the heater surface.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
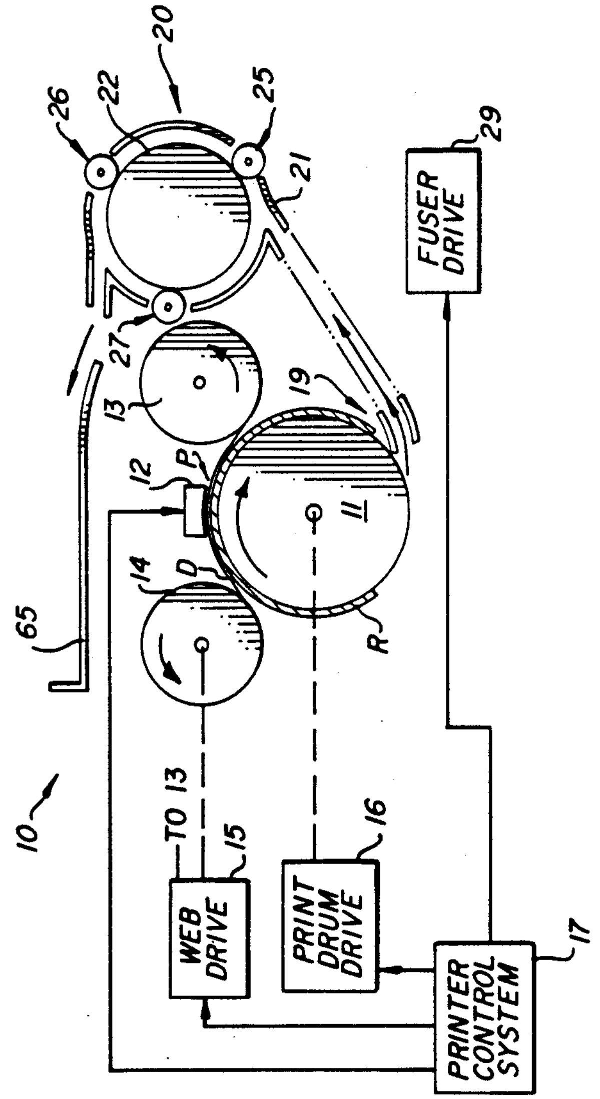
FIG. 1 is a schematic illustration of a thermal transfer printing apparatus incorporating one fuser according to the present invention.
Figure 2:
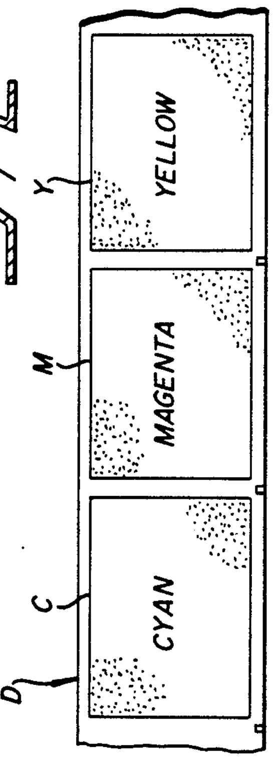
FIG. 2 (PRIOR ART)
FIG. 2 is a plan view showing a donor web useful for color printing in the FIG. 1 apparatus.

While the fusing method of the present invention can be useful with thermal prints formed in a variety of ways, the thermal transfer printer 10 shown in FIG. 1 integrally incorporates one preferred fuser embodiment in accord with the present invention. The printer 10 comprises, in general, a cylindrical print drum 11 for supporting and rotating a receiver R through a print zone P, opposite thermal print head array 12. A donor web D bearing thermally transferable cyan, magenta and yellow dye sections (C, Y, M) in repeating series (see FIG. 2), is fed through the print zone P, (between a receiver R on the print drum and the print head 12) from a supply spool 14 to take-up spool 13 by a drive system 15 coupled to the take-up spool. Exemplary thermal transfer materials and web constructions that are advantageously processed according to the present invention are described in U.S. Pat. Nos. 4,642,655 and 4,804,975. The print drum drive 16 and the donor web drive 15 are controlled by printer control 17 and the donor web drive is constructed to allow the donor to be transported through the print region by the print drum. The print head is also synchronized with the print drum by printer control 17 so that, as the receiver sheet R is rotated three passes through the print zone, different color separation image portions are printed from the sections CMY, in register onto its face.

After completion of three passes an end of the receiver R is unlatched and the drum rotated so that such end is fed through the outlet guide passage 19. U.S. Pat.

No. 4,815,870 shows one exemplary latch and unlatch mechanism which can be utilized.

Figure 3:
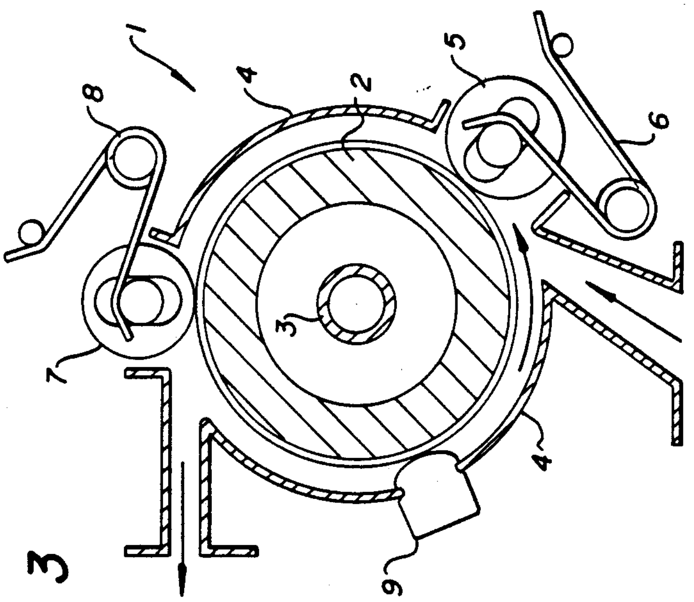
FIG. 3 is a cross-section showing details of one apparatus for fusing print images in accord with the present invention.
Figure 4:
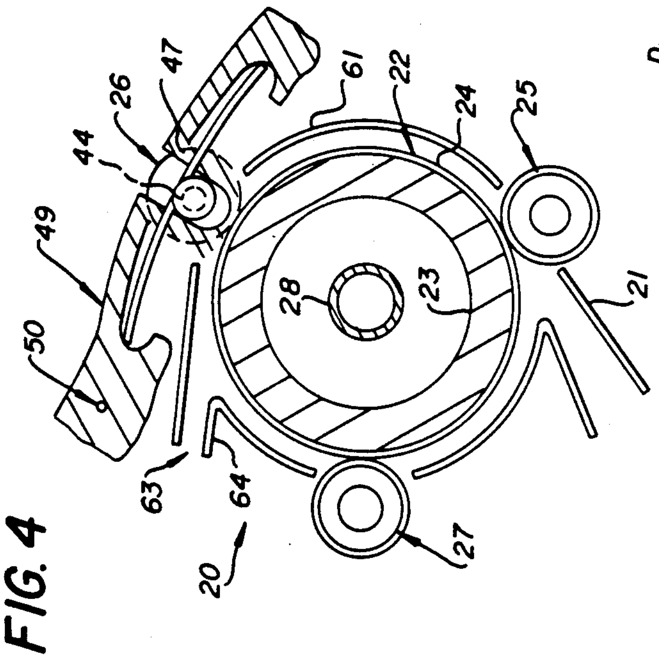
FIG. 4 is a cross-section of another preferred embodiment of fusing apparatus for practice of the present invention.

While FIGS. 1 and 4 show that a fuser apparatus 20 incorporated as an integral part of the printer device 10, the present invention fusing process, can be performed in a separate fusing apparatus, either with the FIG. 1, 4 embodiment or the alternative embodiment shown in FIG. 3.

Referring to FIG. 3, the fuser device 1 comprises a fusing drum 2 heated by an internal heat source 3 and enclosed by a heat retaining shroud 4 extending around its periphery in spaced relation with the drum periphery so as to also define a print guide between the apparatus ingress and egress. A first pressure roller 5 forms a first nip region with the drum 2 proximate the device ingress and is biased into pressure engagement with the drum by torsion spring 6. Thus, a second pressure roller 7 is biased into similar pressure nip engagement with the drum 2 by torsion spring 8 proximate the apparatus egress. A bake path where the print surface moves adjacent the heater, with no pressurized inter-contact, exists between the two nip regions. A temperature sensor 9 is mounted through shroud 4 between the egress and ingress to accurately control the surface temperature of drum 2, e.g. by means of detection and control circuitry (not shown) cooperating with the sensor 9, heater 3 and the heater power source (not shown).

In one preferred mode of operation, the drum is preheated and stabilized to a heating surface temperature in the range of about 210°-230° F. and is continuously rotated by a drive system, not shown. A print comprising an unfused dye image (such as described in the above referenced patents) transferred to a receiver, is fed into the ingress to the nip formed by drum 2 and pinch roller 5, oriented with the print back surface against the roller. The rotationally driven drum draws the print into the nip and forces the pinch roller 5 radially outward against loading spring 6. The intimate contact (e.g. on the order of about 4 lbs. roller load nip) is then formed between the print and the heated drum and enables rapid heat transfer to the print raising the print temperature to approximately 180°-190° F.

The leading edge of the print is then guided around the drum by a section of the heat retainer shroud 4 to the nip of the second pinch roller 7 with the drum 2. The body of the print between the first and second pinch rollers 5, 7 does not maintain intimate contact with the heated drum and therefore does not increase in temperature appreciably. However, in this oven-type environment, the print is gradually relieved of its moisture, at a rate that avoids the occurrence of print blistering. In one preferred embodiment, the rate of drum rotation and path length are selected to provide a bake period of about 3 seconds.

As the leading edge of the print passes through the nip of the second pinch roller 7 with the drum, it forces the pinch roller away from the drum and against its loading spring 8. This load reapplies a similar magnitude intimate contact between the print and the drum so that a final fusing temperature of up to about 230° F. is attained for the transferred image layer. The existing print is then held flat by an output containment (not shown) so that it cools and stabilizes in a flat condition.

Figures 5, 6, 7, 8:
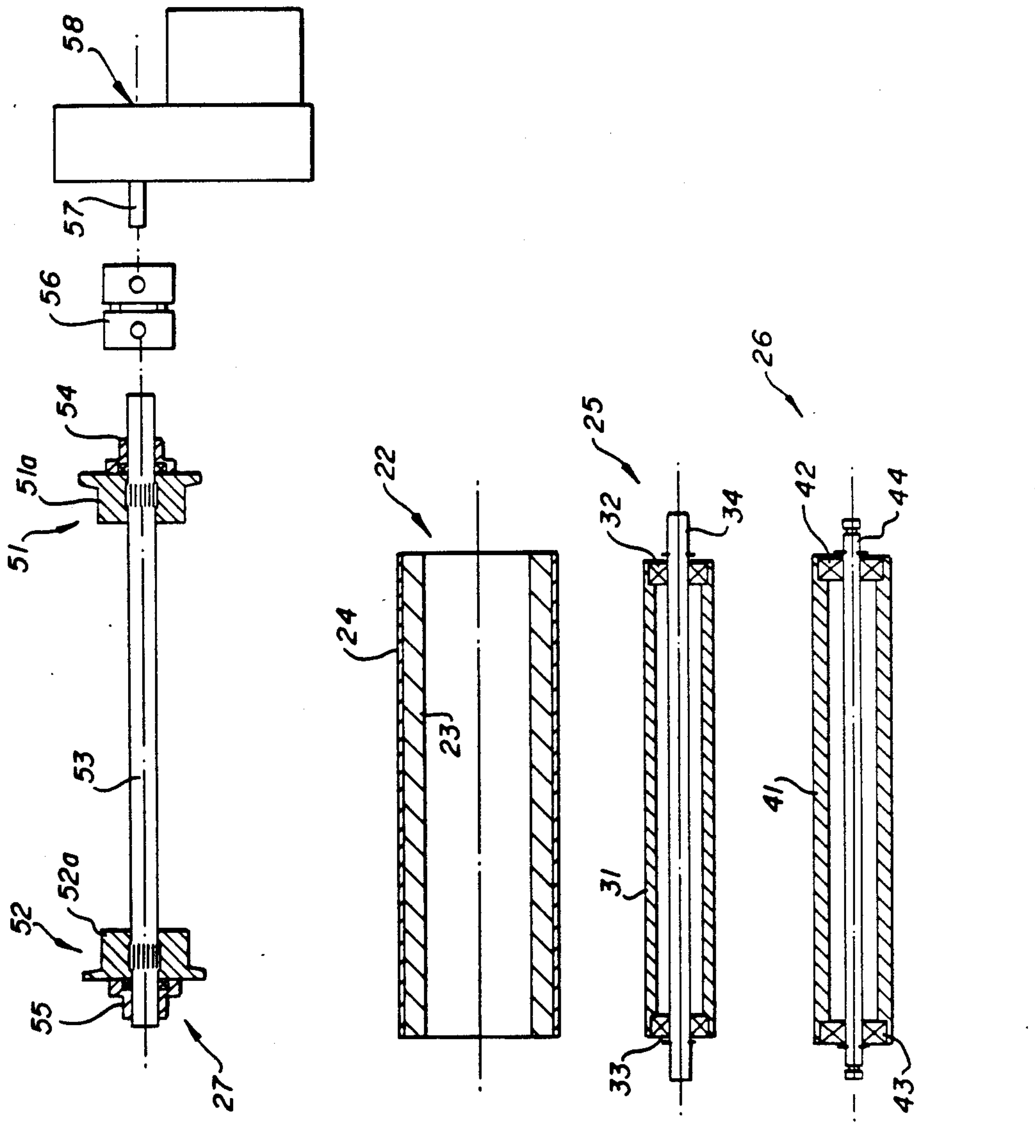
FIGS. 5–8 are longitudinal cross-section views of components of the FIG. 4 fuser embodiment.

The alternative FIG. 1 embodiment of fuser device 20, is shown in more detail in its assembled condition in FIG. 4 and its component structures are illustrated in FIGS. 5-18. This particular structural configuration is the subject of concurrently filed U.S. application Ser. No. 457,037 entitled "FUSING APPARATUS FOR THERMAL TRANSFER PRINTS", of Robert J. Matoushek. In general, fuser device 20 comprises a floating fuser drum 22 that includes a rigid inner shell cylinder 23 formed e.g. of aluminum, and a coating 24 formed of a resilient material, e.g. silastic rubber. The drum 22 is supported and constrained for rotation by three roller assemblies 25, 26, 27, which are mounted within the printer housing for rotation on parallel axes at generally equidistant spacings around the periphery of the drum 22. As shown in FIG. 6 as well as FIG. 4, the drum 22 has open ends so that radiant heater tube 28 can be easily mounted within. Sheet guides 61 and 62 are spaced around the drum periphery to direct the lead end of a sheet under the nips of assemblies 25 and 26 and then out egress 63.

Referring to FIG. 7 as well as FIG. 4, roller assembly 25 comprises an elongated tube 31 having a polished outer surface and end bearings 32, 33 which support the tube for rotation on shaft 34 whose ends are fixed to the printer mainframe.

Referring to FIG. 8 as well as FIG. 4, the roller assembly 26 comprises an elongated, polished tube 41 having end bearings 42, 43, which support it for rotation on shaft 44. Unlike shaft 34, the ends of shaft 44 are mounted for sliding movement, at each end, in slots 47 in a support housing 49. The slots 47 are configured so that the shaft 44 can slide therein toward and away from drum 22 in a direction substantially radial to the drum cylinder. As shown in FIG. 4 wire springs 48 are mounted to the housing section 49 and over the ends of shaft 44 to resiliently urge the shaft ends, and its supported roller tube 41, radially toward drum 22. Preferably, the housing section 49 is removably mounted, e.g. by pivot 50, to the machine mainframe. The section including the spring loaded roller assembly 26 can thus be removed without fear of misalignment to provide access for servicing the fuser interior or removing jammed prints.

Referring to FIG. 5, as well as FIG. 4, it can be seen that roller assembly 27 comprises two flanged drive hubs 51, 52 that are rigidly fixed on a drive shaft 53. Shaft 53 is mounted on bearings 54, 55 and has one end engaged by coupling 56 to the output shaft 57 of a motor drive 58. The flanges of hubs 51, 52 are spaced slightly greater than the length of drum 22 so that their interior surfaces contact the drum ends and maintain its proper longitudinal position during operation. The drive surfaces 51*a*, 52*a* of the hubs are frictional and cooperate with the coating 24 to transmit rotation to the fuser drum via edge sectors of its outer periphery.

In operation, the lead edge of the incoming print is driven into a first pressure-contact nip between the first rigidly mounted roller 25 and the drum 22. The thickness of the print shifts the drum toward the spring loaded roller, with drive roller acting as a fulcrum for its floating movement. The curved sheet metal guide 61 direct the lead edge around the heated drum, through the bake region and into the second pressure-contact nip between the spring loaded roller and the drum. The spring loaded roller is forced away from the drum against its spring force. As the tail end of the print passes through the system, the same sequence occurs in reverse. The leading end of the print sheet is then directed through outlet 63 by guides 64 and into toward output hopper 65. The output guides combine to form a flat confining channel that holds the print flat as it cools during the exit process.

The invention has been described in detail with particular reference to certain preferred embodiments thereof, but it will be understood that variations and modifications can be effected within the spirit and scope of the invention.

I claim:

1. An improved method for fusing thermal transfer dye image portions on a receiver comprising, in order, the steps of rapidly heating dye image portions to a first temperature slightly below the boiling temperatures of the dye image components, maintaining the dye image portions at approximately said first temperature for a time period sufficient to allow signficant evaporation from said dye image portions and, after such evaporation period, rapidly heating such dye image portions to fusing temperature, above said dye image components boiling temperatures.

2. A process for fusing a thermally transferred dye image on a receiver; and process comprising:

(a) feeding the image receiver so that the outer surface of such transferred dye image moves along a fusing path in opposing relation with a moving heated surface;

(b) at an upstream nip region of said fusing path pressing successive transverse sections of the receiver into a forced contact with the heater surface so as to rapidly preheat said image to a temperature in the preheat range of approximately 180°-190° F.;

(c) after such preheating, moving the successive sections of the receiver through a bake region of said path in non-pressured, opposing relation with said heater surface for a period of time sufficient of allow significant evaporation from said dye image; and (d) after such evaporation period, at a downstream nip region, again pressing said receiver into forced contact with said heater surface so as to heat said image to a temperature above said preheat range.

3. The invention defined in claim 2 wherein said step of moving between nip regions is at a rate that provides moisture release to avoid blisters in said image surface.

4. The invention defined in claim 2 wherein said evaporation period is at least about 3 seconds.

5. In thermal printing apparatus constructed to form a transferred dye image on a receiver; an improved fuser device comprising:

(a) heating means, including a heater surface movable along an extended heating path from a path ingress to a path egress;

(b) means, at said path ingress, for feeding a printed receiver onto said heating means with its treansferred dye image face in juxtaposition with said heater surface;

(c) first nip means for urging portions of the receiver moving successively therepast so that their transferred dye image is in pressurized contact with said heater surface; and (d) second nip means, spaced along said path from said first nip means a distance providing an extended length bake region wherein said receiver and heater surface move in non-pressurized opposing relation, for again urging portions of the receiver moving therepast so that their transferred dye image is in pressurized contact with said heater surface.

* * * * *